Patented Nov. 22, 1949

2,488,721

UNITED STATES PATENT OFFICE 2,488,721

SULFONIC ACID MANUFACTURE

George R. Gilbert, Elizabeth, N. J., assignor to Standard Oil Development Company, a corporation of Delaware No Drawing. Application November 10, 1945, Serial No. 627,964

3 Claims. (Cl. 260—505)

This invention relates to an improvement in the art of manufacturing oil-soluble (mahogany) sulfonic acids by the treatment of petroleum oil fractions with a sulfonating agent.

In the manufacture of petroleum sulfonic acids by the treatment of a lubricating oil fraction with strong sulfuric acid, a sludge separates out after settling, and such sludge contains water-soluble sulfonic acids as well as small quantities of oil-soluble sulfonic acids. This sludge may be processed to recover unreacted sulfuric acid and water-soluble sulfonic acids, and, if it is thought economically feasible, it may be treated with an appropriate solvent, such as kerosene, to recover the oil-soluble sulfonic acid content of the same. The residue from such treatments may be conveniently used as fuel.

In accordance with the present invention, it has been found that the sludge resulting from the treatment of a lubricating oil fraction with fresh sulfuric acid may be used to produce oil-soluble sulfonic acids despite the fact that the sludge contains only relatively small quantities of unreacted sulfuric acid of sulfonating strength, and of oil-soluble sulfonic acids, the major content of the sludge being water-soluble or "green" sulfonic acids. The discovery that such sludge can be employed as a sulfonating agent is indeed surprising since heretofore it has been generally reported in the literature that the use of concentrated and/or fuming sulfuric acid is necessary for the production of oil-soluble sulfonic acids. I have now found that acid sludge of the type described may be employed as the sulfonating agent to produce from petroleum fractions oil-soluble sulfonic acids in high yields, yields which are generally as great or greater than those obtained by treatment with fresh acid and with a considerably lower degradation of oil charge to sludge.

Although it is not known with certainty why the acid sludges possess their sulfonating capacity, the following hypothesis may serve as an explanation. It is known that the water-soluble sulfonic acids contained in the sludge derived from lubricating oils are polysulfonic, whereas the oil-soluble sulfonic acids are monosulfonic. It is conjectured that when fresh oil is intimately mixed with the water-soluble polysulfonic acids in the sludge, the polysulfonic acids react with fresh oil to produce one or more equivalents of monosulfonic acids which are oil-soluble. For example, a molecule of disulfonic acid could react with one molecule of sulfonatable fresh oil to produce two molecules of monosulfonic acid, the disulfonic acid having given up one of its sulfonic groups to the fresh oil molecule.

Although unused sulfuric acid and oil-soluble sulfonic acids present in the acid sludge may also contribute to the overall yield of sulfonic acids obtained when heating fresh oil with acid sludge, the effect of these constituents is believed to be only minor for the following reasons:

(1) The effect of the residual sulfuric acid in the acid sludge, when acting as a sulfonating agent, would be to increase the overall amount of sludge formed and to decrease the yield of acid oil, whereas when acid sludge is employed in accordance with the present invention to sulfonate fresh oil, the overall yield of acid oil generally surpasses the amount of fresh oil charged, and the overall amount of sludge formed is reduced proportionately.

(2) The amount of residual oil soluble sulfonic acids normally present in acid sludge is so small that their complete removal would increase the yield of acid oil only by a few percent.

The feed stock which may be used for the production of sulfonic acids in accordance with this invention may be any petroleum lubricating oil fraction containing substantial amounts of sulfonatable material. Such a fraction is preferably derived from a naphthenic type crude oil, although the oil may be derived from other sources. Preferably the feed stock is an oil in which the aromatic content of the crude oil has been concentrated, as in an extract resulting from the treatment of a lubricating oil fraction with a selective solvent, such as phenol, furfural, liquid sulfur dioxide or the like. The sludge which may be employed in the treatment of the above-described feed stock for the production of oil-soluble sulfonic acids may be the sludge which results from the treatment of any type of petroleum fraction, preferably a lubricating oil fraction, with sulfuric acid of at least 90% strength, fuming sulfuric acid, sulfur trioxide, chlorsulfonic acid or fluorsulfonic acid. The treatment may have been for the production of sulfonates, in which case temperatures of about 130° to about 160° F. are usually employed, or the oil may have received milder treatment with the acid at considerably lower temperatures, primarily for the improvement of the quality of the oil. A sludge from any of these types of acid treatment may be used, since all of such sludges contain large amounts of water-soluble sulfonic acids.

The process of the present invention may be carried out by methods similar to the well-known methods using fresh sulfuric acid, the sludge being substituted for such acid. Generally the amount of sludge which is used is about equal in volume to the oil being treated, and this amount may be added in one "dump" in the case of batch treatment, or it may be divided into two or more "dumps." For the best results, the temperature of the treatment should not be lower than about 130° F. nor higher than about 160° F. Lower temperatures than those specified would not result in adequate sulfonation, while higher temperatures would tend to cause decomposition of the sulfonic acids. In any particular case the temperature most favorable to good yields will depend upon the viscosity of the oil, the more viscous oils requiring high temperatures. The oil and sludge mixture is preferably agitated for a period of about ½ to 1 hour or longer and then allowed to settle for a period of 1 hour or as long as may be required to effect a separation of oil and sludge phases, after which the acid oil may be drawn off. If desired, the acid oil may be further treated with a relatively small amount of fresh sulfonating agent to increase the concentration of sulfonic acids. However, any large amount of fresh agent, such as would be encountered in normal "counter-current" acid treating operations, destroys some of the sulfonic acids formed and results in a serious degradation of oil to sludge. The sulfonic acids may be removed from the oil by any of the well-known methods, as by extracting with an aqueous alcohol, or sulfonic acid salts may be produced directly in the oil by the addition of the appropriate basic material and the product used as such or concentrated by distillation of a portion of the oil or by extraction with a suitable solvent.

The following are a number of examples, described in detail, which illustrate the advantages obtained by proceeding in accordance with the method of the present invention, but these examples are not to be considered as limiting the scope of the invention in any way.

*Example 1*

(a) The feed stock was obtained by the phenol extraction of a Coastal lubricating oil distillate having an A. P. I. gravity of 22.8°, a viscosity (Saybolt) at 100° F. of 280 seconds, a flash point of 385° F. and a pour point of —30° F. The extraction was accomplished by treating with 100 vol. per cent of 98% phenol in a counter-current phenol in a counter-current tower at 150 F. tower temperature, 15 vol. per cent of water being injected at the bottom. The extract showed a gravity of 13.1° A. P. I., 990.5 sec. viscosity at 100° F., 56.9 sec. viscosity at 210° F., a flash point of 360° F., and a pour point of —15° F. 1910 grams of this extract was treated with 520 cc. of 98% sulfuric acid (200#/bbl.) at room temperature. The mixture was agitated vigorously by air blowing for 30 minutes and then allowed to settle for 1 hour. The supernatant acid oil was decanted and weighed, whereby 61.5% of acid oil based on the original oil charge was recovered. The oil was neutralized with an excess of sodium carbonate and the sulfonates formed extracted with aqueous isopropyl alcohol. The yield was 10.4% sodium sulfonates, based on the original oil charge.

(b) For comparison, 440 grams of the phenol extract used in (a) was mixed with 400 grams of the sludge obtained from (a) and agitated vigorously at room temperature for 1 hour, after which the mixture settled for 36 hours at 130° F. The supernatant acid oil obtained by decantation weighed 442 grams. On neutralizing this oil with sodium carbonate and analyzing for the resulting sulfonates, the yield of sodium sulfonates was found to be 10.3%. Although the amount of sodium sulfonates produced by the use of sludge for sulfonation was approximately the same as when fresh acid was used, the use of sludge resulted in an actual gain in the weight of the oil rather than a considerable loss as when fresh acid was used. In addition, for the combined operations of (a) and (b) the total yield of sulfonates per pound of fresh acid was double that obtained in the treatment with fresh acid alone, as in (a).

*Example 2*

(a) 10,065 grams of the phenol extract used in Example 1 was mixed with 1335 cc. of 98% sulfuric acid and agitated for 30 minutes at 150–170° F., following which the mixture was settled at this temperature for 30 minutes and the sludge withdrawn. An additional 1335 cc. of 98% sulfuric acid was added under the same conditions, followed by stirring for 30 minutes at 150–170° F. and settling at the same temperature for several hours. The acid oil was decanted and weighed, showing an acid oil yield of 61%, based on the oil charge. Neutralization of the oil with sodium carbonate and analysis of the sulfonates produced showed a yield of 14.6% of sodium sulfonates, based on the original oil charge.

(b) For comparison, 10,420 grams of the same phenol extract was mixed with all the sludge obtained in (a) at 160° F. and agitated vigorously for 30 minutes, following which the mass was settled at 160° F. for several hours and the acid oil decanted. The acid oil weighed 11,190 grams, a gain in weight of about 7% compared to a 39% loss in weight in (a). Neutralization of the oil with sodium carbonate and analysis of the sulfonates showed a yield of 16.1% of sodium sulfonates.

*Example 3*

(a) 470 grams of the phenol extract used in Examples 1 and 2 was mixed with 113 grams of 98% sulfuric acid, agitation was continued for 1 hour at 150–160° F., followed by 16 hours settling at the same temperature. The sludge was removed and another portion of 113 grams of 98% sulfuric acid was added and the process repeated under the same conditions. The acid oil after this treatment weighed 286 grams, a recovery of 61% based on the original charge. Neutralization of the acid oil with sodium carbonate and analysis of the sulfonates showed a yield of 42 grams or 8.7% based on the original oil charge.

(b) For comparison, 470 grams of the same phenol extract was mixed with 205 grams of an acid sludge obtained in the sulfuric acid treatment of a Coastal lubricating oil fraction having an A. P. I. gravity of 22.2; a viscosity of 529.5 seconds (Saybolt) at 100° F. and 55.1 seconds at 210° F., a flash point of 405° F., and a pour point of —25° F. In obtaining this sludge the acid used was 98% sulfuric acid, the temperature of treatment was 150–160° F., agitation with the introduction of air being continued for ½ hour followed by 1 hour of settling. This sludge, after mixing with the phenol extract, was agitated for 1 hour at 150–160° F., followed by 16 hours settling at the same temperature. The acid oil recovered weighed 455 grams, which is equivalent to 97% of the oil charge. Neutralization with sodium sulfonate and analysis of the sulfonates showed a yield of 50 grams of 10.6% based on the charge.

The above examples show clearly that substantial yields of oil-soluble sulfonates may be obtained when using an acid sludge as the acid treating material.

The present invention is not to be considered as limited in any way by any of the examples which have been described by way of illustration. The scope of the invention is to be limited solely by the appended claims.

I claim:

1. A process for the preparation of mahogany sulfonic acids which comprises contacting a substantially aromatic petroleum lubricating oil fraction at a temperature of about 130° F. to about 160° F. with an acid sludge separated from a petroleum lubricating oil fraction after treatment of the same with a sulfonating agent selected from the class consisting of sulfuric acid of at least 98% strength, fuming sulfuric acid, sulfur trioxide, chlorsulfonic acid and fluorsulfonic acid.

2. A process according to claim 1 in which the sulfonating agent is sulfuric acid of at least 98% strength.

3. A process according to claim 1 in which the substantially aromatic petroleum lubricating oil fraction is an extract obtained by phenol extraction of a petroleum lubricating oil fraction.

GEORGE R. GILBERT.

REFERENCES CITED

The following references are of record in the file of this patent:

UNITED STATES PATENTS

| Number | Name | Date |
| --- | --- | --- |
| 1,087,888 | Petroff | Feb. 17, 1914 |
| 1,474,933 | Humphreys et al. | Nov. 20, 1923 |
| 1,956,571 | Grillet | May 1, 1934 |
| 2,368,452 | Dawson | Jan. 30, 1945 |

OTHER REFERENCES

Chemical Abstracts, vol. 23, page 963$^3$ (1929).

Ind. & Eng. Chemistry, Anal. ed., vol. 7, pp. 378–380 (1935).

Chemical Abstracts, vol. 30, page 3987$^3$ (1936).

Groggins, "Unit Processes in Organic Syntheses," 2nd ed., McGraw-Hill Book Co., New York, N. Y. (1938).